UNITED STATES PATENT OFFICE.

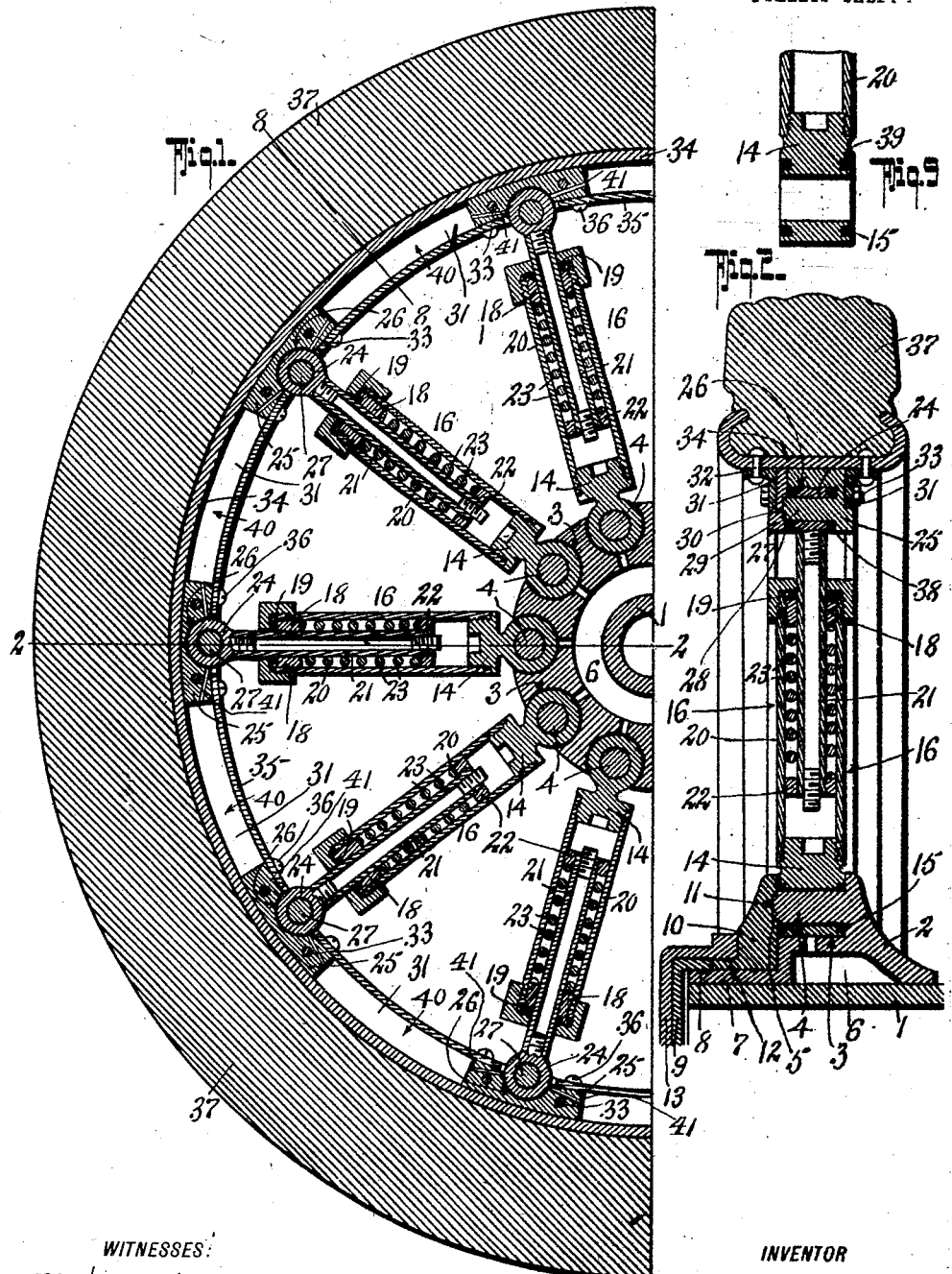

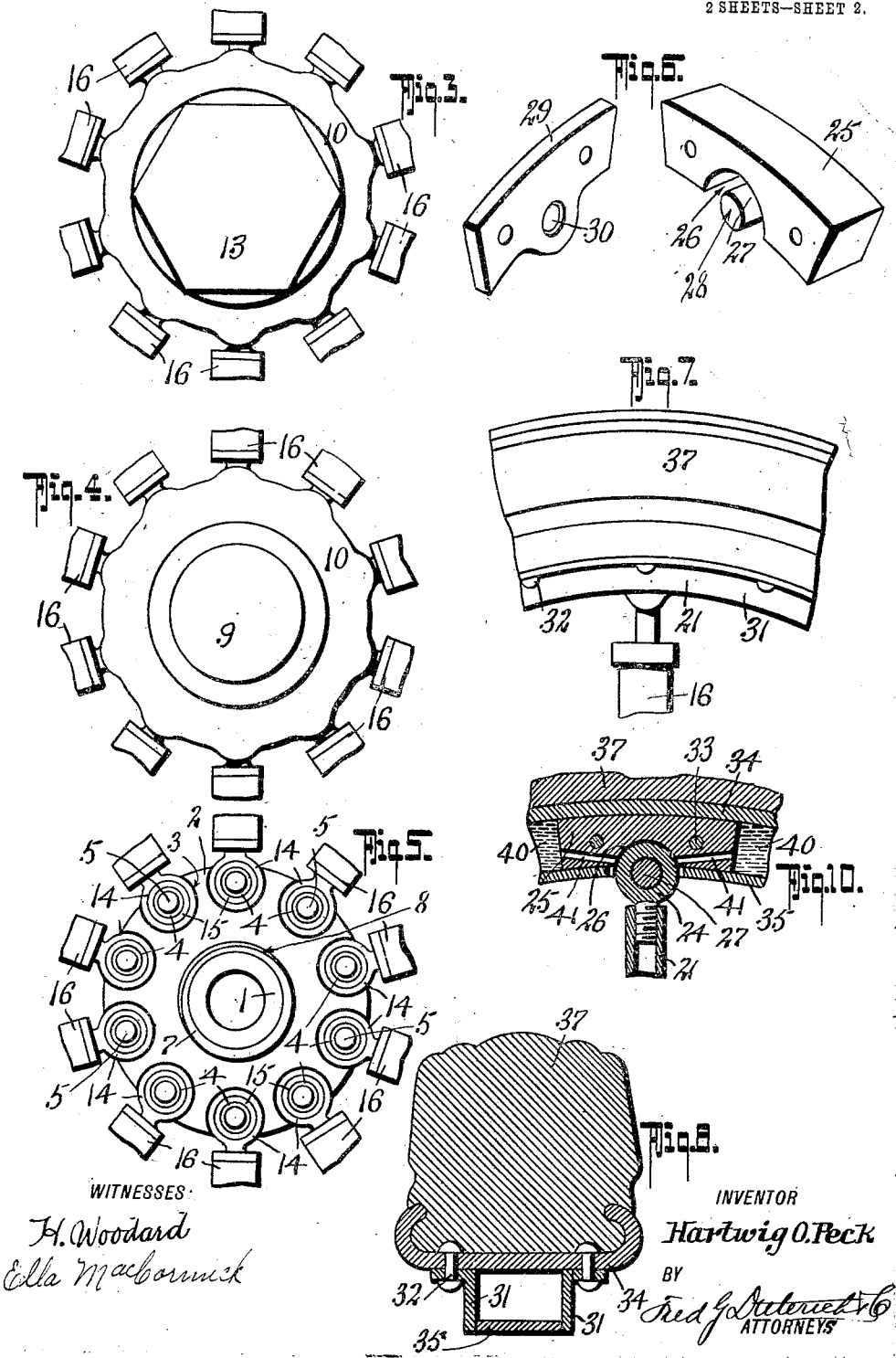

HARTWIG O. PECK, OF PORTLAND, OREGON, ASSIGNOR TO THE H. O. PECK AUTOMOBILE WHEEL CO. INCORPORATED, OF PORTLAND, OREGON.

VEHICLE-WHEEL.

943,563.

Specification of Letters Patent. Patented Dec. 14, 1909.

Application filed May 13, 1909. Serial No. 495,582.

*To all whom it may concern:*

Be it known that I, HARTWIG O. PECK, residing at Portland, in the county of Multnomah and State of Oregon, have invented certain new and useful Improvements in Vehicle-Wheels, of which the following is a specification.

My invention is an improved vehicle wheel of the resilient spoke type and in its generic nature the invention has for its object to provide a wheel of this type which will be as nearly dust proof as possible and in which the parts are so constructed and designed as to effect a maximum strength of parts with the least possible weight.

More specifically the invention resides in an improved construction of rim and hub joined by spokes of the type disclosed in my copending application filed March 9, 1909, Serial No. 482,230. The hub is formed of a member having a series of pockets to receive the pivot heads of the spokes, such member having integral pivot pins disposed centrally in such pockets and having projecting ends to enter recesses on a flange that is secured on a hub to close the pockets and steady the pins. The rim is formed of a channel member to receive the tire, to which member a pair of spaced annular angle irons are secured to receive a series of pivot blocks between them. Each pivot block (there being one for each spoke) is composed of a member having a pocket to receive the pivot head of a spoke and having an integral pivot pin in such pocket, the projecting end of which fits a depression in the face of a closure plate that forms a part of such block. The blocks are secured at intervals between the angle irons and the spaces between adjacent blocks are closed by filler plates that are held between the angle irons and are secured to the blocks at their ends. The pivot heads of the spokes have felt rings or washers to keep dust out of the bearings as well as to absorb oil and maintain the desired lubrication of the parts.

My present invention also resides in those novel details of construction, combination and arrangement of parts, all of which will be first described and then be specifically pointed out in the appended claims, reference being had to the accompanying drawings, in which:

Figure 1 is a central vertical longitudinal section of a part of a wheel embodying my invention. Fig. 2, is a section on the line 2—2 of Fig. 1. Fig. 3, is a side elevation of the hub, the spokes being broken away. Fig. 4, is a similar view, the lock nut cap being removed. Fig. 5, is a similar view, the lock nut, the flange nut and the hub flange disk being removed. Fig. 6, is a detail perspective view of a rim pivot block the two sections being shown separated. Fig. 7, is a detail side elevation of a part of the rim. Fig. 8, is a section on the line 8—8 of Fig. 1. Fig. 9, is a section showing a modified manner of holding the felt washer rings in the pivot heads of the spokes. Fig. 10, is an enlarged detail view of a part of my invention.

Referring now to the accompanying drawings, in which like numerals of reference indicate like parts in all of the figures, the axle 1 receives the hub 2 which is provided with a series of circular pockets 3 to receive the heads 14 of the spokes 16. Within each pocket and integrally formed with the hub is a pin 4 that projects through the pivot aperture of the spoke head 14, and has a projecting end 5 for a purpose presently explained.

The hub 2 may be provided with an internal annular pocket 6 between it and the axle that may be used to contain grease to lubricate the bearings of the spoke heads on the pins 4 by providing small capillary passages between the pocket 6 and the pockets 3, as shown in Fig. 2 of the drawings. The hub 2 has a forwardly projecting sleeve 7 that is threaded on its end as at 8 to receive the nut cap 9 that abuts the threaded portion 12 in the flange cap 10 which forms a closure for the pockets 3 and which is depressed at 11 to receive the projecting ends 5 of the pins 4.

A dust cap and lock nut member 13 is threaded onto the threaded portion 12 of the flange plate or cap 10 and serves as a lock nut for the nut cap 9. The spoke heads 14 have countersunk portions to receive felt washer rings 15 that serve to prevent dust entering the pockets 3. Instead of countersinking the pin aperture of the heads 14 to receive the felt rings 15, such heads 14 may be grooved as at 39 in Fig. 9 to receive the felt rings 15.

Each spoke 16 comprises an outer casing 20 threaded onto the pivot head 14 and having its other end internally threaded to receive the plug 18 that carries the felt ring or washer 19 and which is held in place and prevented from coming unscrewed from the tube or casing 20 by the lock nut that is threaded over the end of the casing tube 20, as shown in Fig. 1, of the drawings.

Within the tube 20 is a piston rod 21 that carries a piston 22 at its inner end and a pivot head 24 at its upper end, while a coil spring 23 within the tube 20 tends to force the piston toward the hub and telescope the spoke sections 21 and 20. The pivot heads 24 are held in pockets 26 in pivot blocks 25 which are secured between annular angle irons 31 that are in turn secured at 32 to the rim 34 which carries the tire 37 of any approved construction. Each pivot block 25 has a pocket 26 in which a centrally disposed pivot pin 27 is located, the pin 27 projecting through an aperture in the pivot head 24 of the piston rod 21 and having a projecting end 28 held in a recess 30 in a plate 29 that forms a part of the pivot block 25 and acts as a closure for the pocket 26, the plate 29 being secured to the block 25 by the bolts 33 which secure the block 25 to the angle irons 31. The spaces between adjacent blocks 25 and the angle irons 31 are closed by filler plates 35 that are secured at 36 to the pivot blocks 25 and form closed pockets 40 within the rim, which pockets 40 may be used to contain grease, or other suitable lubricant that may be passed through capillary passages 41 to the pockets 26 if desired, to lubricate the moving parts, as shown in Figs. 1 and 10 of the drawings.

The pivot heads 24 of the spokes are provided with felt washer rings 38 in a manner similar to the heads 14 and for the same purpose.

From the foregoing it will be noticed that by the construction of vehicle wheel herein described practically dust-proof bearings are provided for the different parts and at the same time a very efficient construction of wheel is produced.

From the foregoing description taken in connection with the accompanying drawings it is thought the complete construction, operation and advantages of my invention will be readily understood by those skilled in the art to which the invention appertains.

What I claim is:

1. In a vehicle wheel, a spoke having an apertured pivot head, a member having a pocket, and an integrally formed pin held centrally in said pocket, said pivot head being held in said pocket with said pin projected through the aperture in said pivot head, and a cap member for closing said aperture, said cap member having a depression to receive the projecting end of said pin.

2. In a vehicle wheel, a spoke having an apertured pivot head, a member having a pocket, and an integrally formed pin held centrally in said pocket, said pivot head being held in said pocket with said pin projected through the aperture in said pivot head, a cap member for closing said aperture, said cap member having a depression to receive the projecting end of said pin, said pivot head having ring receiving portions, and washer rings held in said ring receiving portions.

3. In a vehicle wheel a rim formed of a channeled member to receive a tire, spaced angle irons secured to said channeled member, blocks secured between said angle irons at intervals and adapted to receive a spoke end, and filler plates secured to said blocks between said angle irons.

4. In a vehicle wheel a rim structure comprising an annular channeled member to receive a tire, annular angle members secured to said channeled member and spaced apart, pivot blocks secured at intervals between said angle members, each of said pivot blocks having pivot pins surrounded by pockets to receive a pivot head of a spoke, a closure member for said pockets having recesses to receive projecting ends of said pivot pins, and spokes having pivot heads held on said pins in said pockets.

5. In a vehicle wheel a rim structure comprising an annular channeled member to receive a tire, annular angle members secured to said channeled member and spaced apart, pivot blocks secured at intervals between said angle members, each of said pivot blocks having pivot pins surrounded by pockets to receive a pivot head of a spoke, a closure plate for said pockets having recesses to receive projecting ends of said pivot pins, spokes having pivot heads held on said pins in said pockets, and filler plates secured to said blocks between said angle members to form chambers.

6. In a vehicle wheel a rim structure comprising an annular channeled member to receive a tire, annular angle members secured to said channeled member and spaced apart, pivot blocks secured at intervals between said angle members, each of said pivot blocks having pivot pins surrounded by pockets to receive a pivot head of a spoke, a closure plate for said pockets having recesses to receive projecting ends of said pivot pins, spokes having pivot heads held on said pins in said pockets, filler plates secured to said blocks between said angle members to form chambers, said pivot blocks having apertures effecting communication between said chambers and said pockets.

HARTWIG O. PECK.

Witnesses:
I. S. ARMSTRONG,
W. J. MAKELIM.